United States Patent [19]
Hedlund

[11] Patent Number: 5,688,080
[45] Date of Patent: Nov. 18, 1997

[54] TOOL SHAFT WITH DETACHABLE BLADE HAVING WEDGE GROOVE CONTACTING A MOVABLE WEDGE

[75] Inventor: Thomas Hedlund, Gästrike-Hammarby, Sweden

[73] Assignee: Sandvik AB, Sandviken, Sweden

[21] Appl. No.: 622,930

[22] Filed: Mar. 27, 1996
(Under 37 CFR 1.47)

Related U.S. Application Data

[63] Continuation of Ser. No. 206,167, Mar. 7, 1994, abandoned.

[30] Foreign Application Priority Data

Mar. 18, 1993 [SE] Sweden .................. 9300890

[51] Int. Cl.⁶ ........................................... B23B 27/04
[52] U.S. Cl. ........................................ 407/101; 407/117
[58] Field of Search .......................... 407/47, 76, 79, 407/97, 98, 94–96, 101, 110, 117

[56] References Cited

U.S. PATENT DOCUMENTS

| | | | |
|---|---|---|---|
| 3,125,798 | 3/1964 | Stein | 407/101 |
| 3,455,191 | 7/1969 | Graf. | |
| 3,758,927 | 9/1973 | Stein | 407/101 |
| 3,780,408 | 12/1973 | McCreery | 407/88 |
| 3,844,008 | 10/1974 | Sletten | 29/96 |
| 3,859,699 | 1/1975 | Lindskog. | |
| 4,406,195 | 9/1983 | Kruger et al.. | |
| 4,784,542 | 11/1988 | Tack et al. | 409/234 |
| 4,938,641 | 7/1990 | Maier | 407/110 |
| 5,112,164 | 5/1992 | Pano | 402/110 |
| 5,288,180 | 2/1994 | Hedlund | 407/101 |

FOREIGN PATENT DOCUMENTS

| | | |
|---|---|---|
| 2 935 400 | 3/1981 | Germany. |
| 417 066 | 2/1981 | Sweden. |

*Primary Examiner*—M. Rachuba
*Assistant Examiner*—Kenneth J. Hansen
*Attorney, Agent, or Firm*—Burns, Doane, Swecker & Mathis LLP

[57] ABSTRACT

A cutting tool for metal machining, in particular for grooving and parting operations, comprises a cutting insert-holding blade part (2) and a tool shaft (1), whereby both are formed with mutually matching joint portions. The blade part has a wedge groove (13) and the tool shaft a wedge part (18). This wedge part (18) comprises a movable wedge (20) with which the width of the wedge part can be varied in order to obtain a play-free joint with the wedge groove of the blade part.

16 Claims, 3 Drawing Sheets

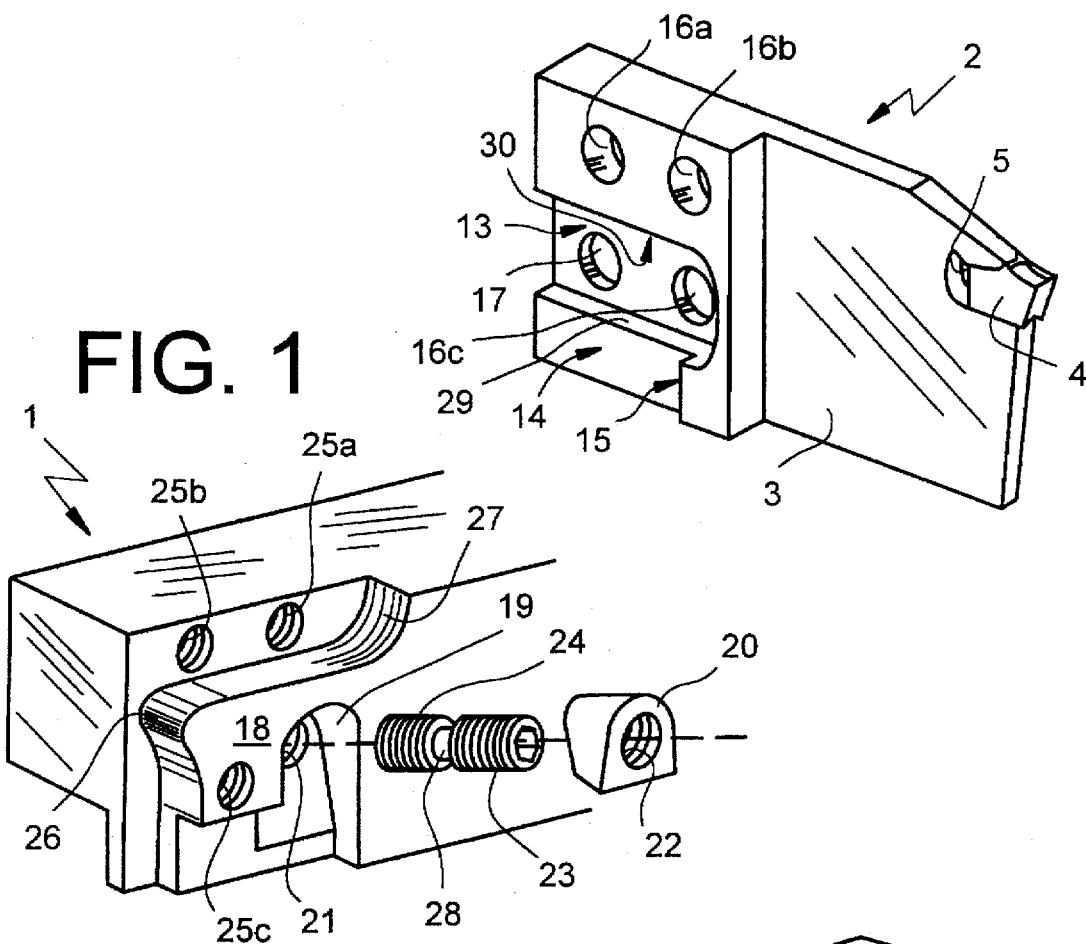
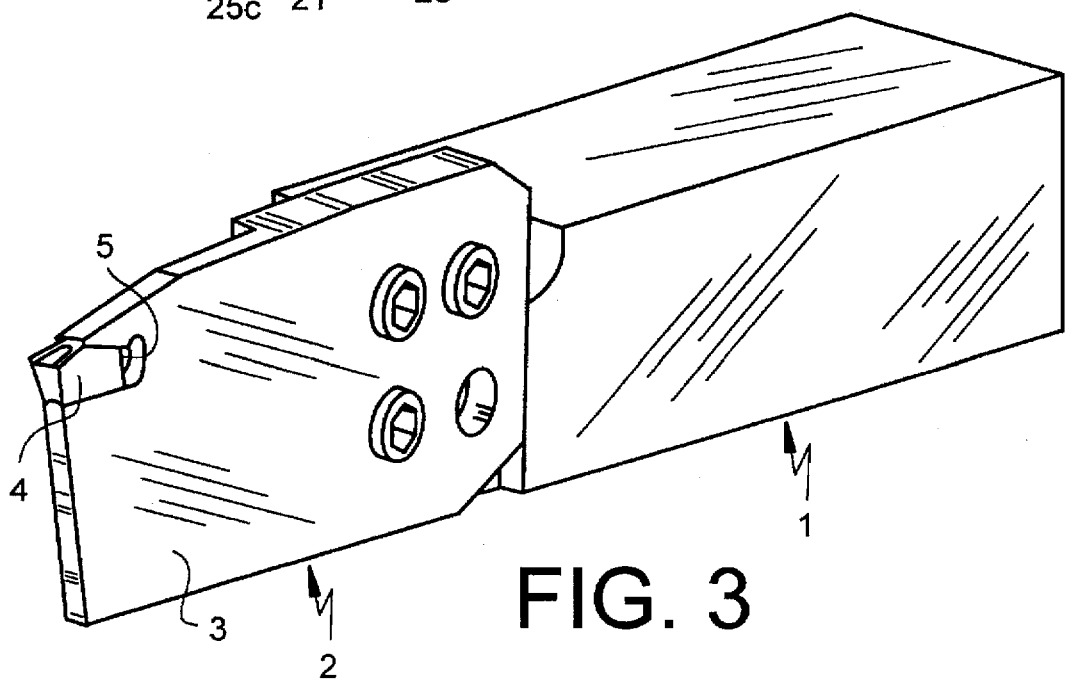

5,688,080

TOOL SHAFT WITH DETACHABLE BLADE HAVING WEDGE GROOVE CONTACTING A MOVABLE WEDGE

This application is a continuation of application Ser. No. 08/206,167, filed Mar. 7, 1994 now abandoned.

BACKGROUND OF THE INVENTION

1. Field of the Invention

The present invention relates to a metal machining tool for grooving and parting operations. The tool comprises a blade part with a cutting insert and a detachably joined tool shaft thereto. Both the blade part and the tool shaft include parts matching to each other.

2. Description of Related Art

A number of tools for grooving and parting operations are previously known, according to which the tool comprises a shaft and a blade part with a cutting edge connected thereto in a suitable manner. Thus, in SE-B-417 066 a tool is disclosed that comprises a blade part with a cutting insert, which blade part is fastened to a side of a tool shaft by a screw. This screw is inserted into a recess extending straight across the blade part, whereafter it is threaded into a threaded bore in the tool shaft. In order to obtain a good positioning and good stability, one of the side surfaces of the blade part is also provided with a wedge part intended to fit into a correspondingly formed wedge groove in the tool shaft. However, it has turned out that this construction does not accomplish the desired maximal stability when machining in tough and medium-tough materials. On account of this, the wedge part and the wedge groove have to be made with very high precision accuracy, and still a certain loose arises, in particular after long times of use.

EP-A-300 544 describes a tool in which each of two adjacent edges on the tool shaft has a protruding part, which have as purpose to comprise and stabilize a blade part with a cutting insert. Also this construction requires very small dimension allowances and precision grinding becomes necessary. In spite of this, a certain play easily appears after some time of use. This play is mainly caused be the deformations that occur mainly on the front part of the lower wedge, where both radial and tangential forces are added. Further, this construction brings about a weakening of the joint portion of the blade part, since the tool shaft clasps along both sides of the blade part and therefore has to be wider that the blade part. Of these reasons, this construction cannot be used for any large grooving or parting depths.

Also our own Swedish patent application 9102262-4 relates to a tool for grooving and parting operations comprising a fastening body with a cutting insert and a tool shaft detachably attached thereto. The fastening body includes a blade part with a cutting insert and a second protruding part, perpendicular to the first one. Both the blade part and the second, protruding part have screw holes for fixing of the fastening body on the tool shaft. This double, mutually perpendicular joint makes necessary a high dimension precision at the boring of the screw holes in the fastening body and the tool shaft, respectively. Also here, a certain play can gradually arise between fastening body and tool shaft after longer use.

OBJECTS AND SUMMARY

A first object of the present invention is thus to construct a cutting tool for grooving and parting operations, in which the play between the tool shaft and a blade part detachably attached thereto i reduced to a minimum, or is even completely eliminated.

A second object of the present invention is to obtain a joint between a tool shaft and a blade part which is stable and free from play but still does not require a high dimension precision, such as the one obtained at precision grinding.

A further object with the present invention is to produce a cutting tool with a stable and play-free joint between blade part and tool shaft but which still shall have a lowest possible production cost.

Still a further object of the present invention is to provide a cutting tool with a joint between a blade part and a tool shaft, in which joint the relative sizes of the abutment surfaces have been related to the magnitudes of the forces applied on each respective surface.

Another object of the present invention is to provide a cutting tool, whose joint between blade part and tool shaft permits long over-hangs, with maintained optimal machining conditions.

These and still other objects have been attained by constructing a cutting tool encompassing the features defined in the characterizing part of claim 1.

BRIEF DESCRIPTION OF THE DRAWINGS

For illustrative but non-limiting purposes, some preferred embodiments of the invention will now be further described in connection with the appended drawings, in which:

FIG. 1 shows a tool shaft according to the invention in a perspective view, with a screw and a wedge;

FIG. 2 shows a blade part according to the invention in a perspective view;

FIG. 3 shows the tool shaft and the blade part according to FIGS. 1 and 2, mounted together, in a perspective view;

DETAILED DESCRIPTION OF THE PREFERRED EMBODIMENTS

Figure 8:
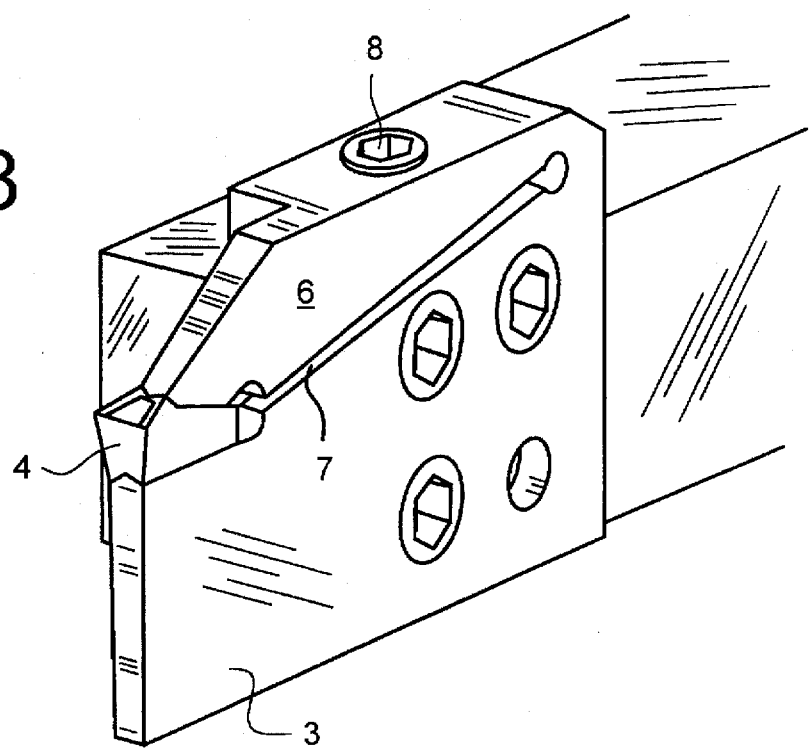
FIGS. 8 and 9 show alternative fastening arrangements for the cutting insert in the blade part.
Figure 9:
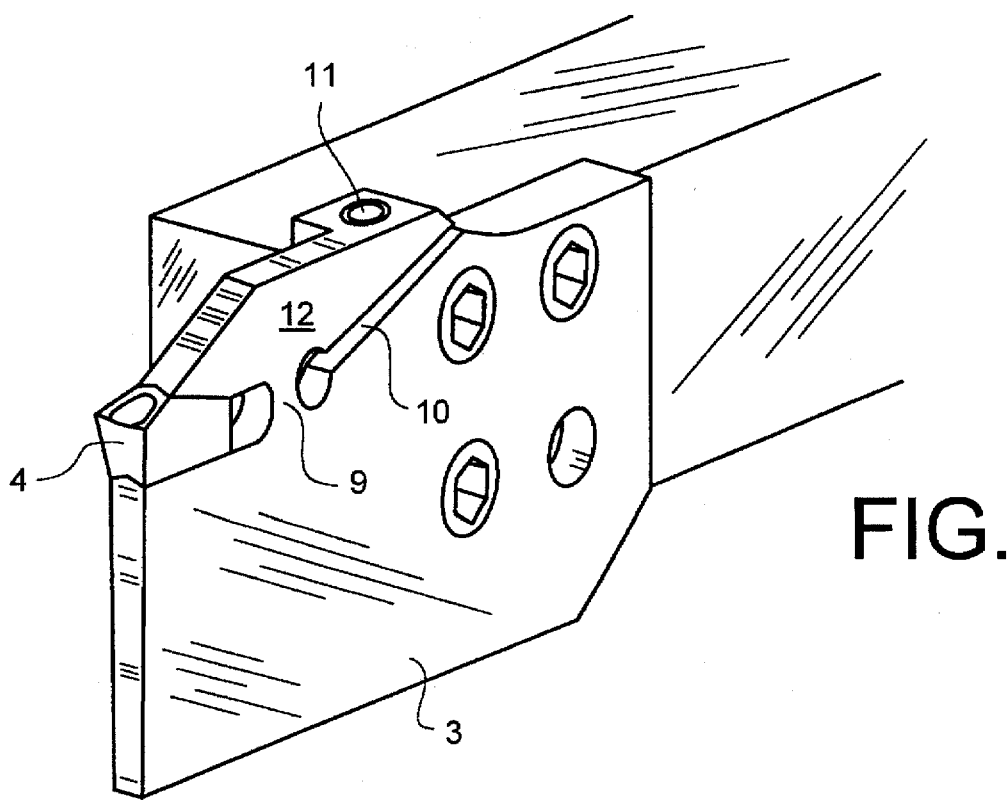

In the figures the tool shaft is generally designated by 1 and the blade part by 2. The front end 3 of the blade part carries a cutting insert 4 for grooving and parting operations. According to the embodiment in FIGS. 2 and 3, insert 4 is fixed in a recess 5 at the top front corner of front end 3, whereby the required clamping force is brought about by the inherent, elastic capacity of the material. Of course, also other fixing constructions are possible, as can be seen in FIGS. 8 and 9. Thus, according to FIG. 8 the necessary clamping force is realized by a screw clamp arrangement. This arrangement comprises an upper clamp arm 6, which is formed by a slit 7 in the blade part. Clamp arm 6 is activated by tightening a clamp screw 8; which extends downwards past the slit and is threaded into the blade part below the slit. The necessary clamping force on the cutting insert can also be effected by a hinge-like clamping arrangement according to FIG. 9, which is further described in our own European patent application EP-A-491 669, hereby incorporated by this reference. According to this construction, part 9 between the recess for the cutting insert and a slit 10 functions as a hinge for the upper part 12. Tightening screw 11 is threaded in the upper part 12 and presses against the lower side of slit 10. By turning screw 11 downwards, part 12 is forced to swing over against insert 4. Since the distance from hinge 9 to tightening screw 11 is larger than the corresponding distance to the abutment surface against the cutting insert, the clamping force caused by the tightening screw will increase according to the lever principle.

The rear portion of the blade part, as seen from the cutting position, is made up by the joint part. In order to guarantee sufficient stability and to accommodate a wedge groove 13, this portion of the blade part is dimensioned with larger thickness than front part 3. The surface under wedge groove 13 is provided with a recess 14. Thereby, a lower abutment surface 29 is formed in the wedge groove, which surface is narrower than the upper abutment surface 30. Further, a shelf 15 is formed, constituting an abutment surface for radial forces when the cutting insert is in operation with a work piece. Moreover, the joint portion of the blade part is provided with three smooth holes 16a, 16b and 16c for the insertion of three fastening screws. A part of each of these three holes can be formed with a larger diameter in order to make possible a countersinking of the heads of the fastening screws. Furthermore, a hole 17 is foreseen, through which a key can be inserted in order to activate the double-screw or differential screw 28.

Figure 4:
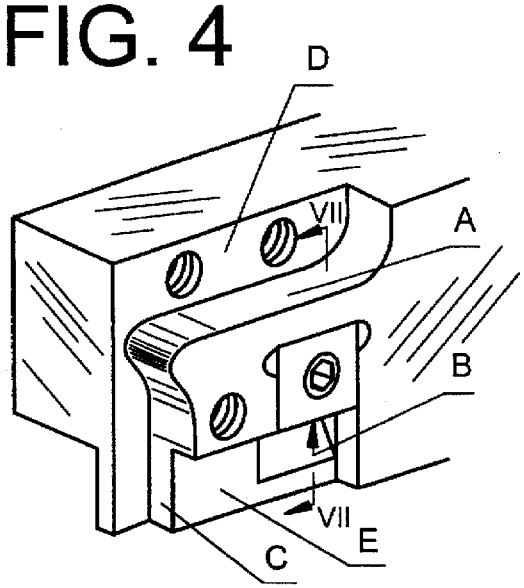
FIG. 4 shows substantially the same tool shaft as FIG. 1, with the joint portion parallel to the longitudinal axis of the tool shaft.

According to FIG. 4, one of the two vertical sides of the front part of the tool shaft is formed as the joint portion. This joint portion comprises a wedge part 18 intended to fit into the wedge groove 13 of the blade part. In order to guarantee a good wedge dimensioning, the relation between the height and the upper width of the wedge part should be around 2:1. Starting from the lower side of the wedge part, a recess 19 is foreseen for accommodating a loose wedge 20. Recess 19 has a threaded hole 21 and wedge 20 has a threaded hole 22 for fastening of wedge 20 by double-screw 28. Double-screw 28 has two threaded portions with opposite thread directions, equally to holes 21 and 22. This, e.g., screw portion 23 and wedge hole 22 can have a left-handed thread while screw portion 24 and hole 21 have a right-handed thread. The rounded envelope surface of the wedge should substantially correspond to the rounded surface of recess 19. In order to maintain contiguous and uninterrupted abutment between the surfaces of the wedge and the recess at a movement of the wedge along the longitudinal axis of the double-screw by turning of the same, the abutment surfaces of the wedge and of the recess should be substantially parallel to the axis of the double-screw and in contiguous, slidable contact with each other. To some extend, one can also make use of the play in the thread.

According to FIG. 1, wedge 20 and recess 19 have round abutment surfaces. This has two advantages: on the one hand, the pressure from the blade part on surface B of the wedge is evenly distributed along the curved abutment surface, and on the other hand, smaller corrections can be made by slightly turning wedge 20 around the axis of double-screw 28, if the upper and lower abutment surfaces of wedge groove 13 are not fully parallel. However, if desired, wedge 20 and recess 19 can also be formed with other basic geometrical forms. Thus, in accordance with FIG. 4, a wedge and a recess of square basic form have been chosen.

Figure 6:
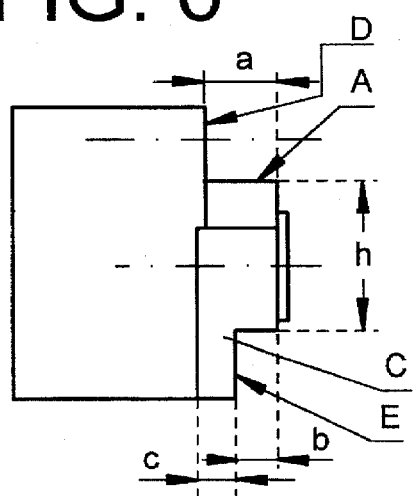
FIG. 6 shows the tool shaft in FIG. 4 frontally.
Figure 7:
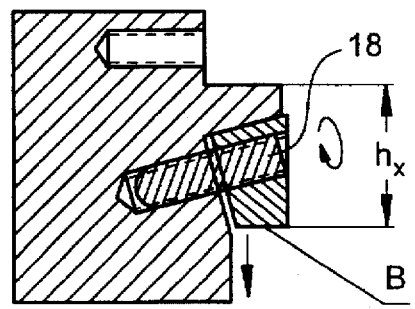
FIG. 7 shows a cross-section along line VII—VII in FIG. 4.

As mentioned above, the loose wedge 20 can be arranged to move along the longitudinal axis of double-screw 28 by turning of the latter. For instance, by turning the double-screw a distance $\delta$ into the hold 21, wedge 20 moves a distance $2\delta$ in the same direction. If the angle of the screw in relation to the horizontal plan is $\alpha$, the lower surface B of the wedge is thereby moved a distance $2\delta \cdot \sin\alpha$ vertically. In practice, this vertical displacement can amount to about ½ mm. This is fully sufficient for eliminating any possible tangential loose that may arise between wedge groove 13 and wedge part 18. This adjustable wedge height $h_x$ on the tool shaft effects several advantages, both at the manufacture of the cutting tool and at its use in cutting machining. Hence, e.g., wedge part 18 and wedge groove 13 can both be manufactured with a preset width with large tolerance, cf. h in FIG. 6. Of this follows that one can avoid costly grinding operations. Further, the cutting tool becomes less affected by hardening modifications, which can arise in the blade part as well as in the tool shaft. Thanks to the complete abutment against the upper wedge part surface A, this surface can sustain large loads, which makes it possible to construct short, compact joint portions or joint areas. Moreover, it is economically more favorable to compensate for possible play with a loose wedge in the tool shaft rather than in the blade part, since the shaft does not have to be replaced in the event of tool breakdown, which will only damage the blade part.

It is well known for the skilled man that the radial, axial and tangential forces on a joint at grooving and parting operations are of different magnitudes. In spite of this knowledge, according to prior art the different joint abutment surfaces that shall absorb these different force composants, have not been adapted to these varying strains. In contrast thereto, the present invention has fully made use of this insight and in a surprisingly simple manner adapted the sizes of the involved abutment surfaces to the forces exerted on them, both on the tool shaft and on the blade part.

Figure 5:
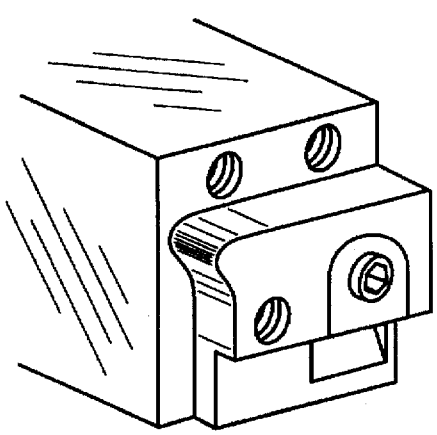
FIG. 5 shows a tool shaft with the joint portion perpendicular to the longitudinal axis of the tool shaft.

In FIGS. 4 and 5 the different force-sustaining surfaces are designated A, B, C, D and E. The axial abutment pressure against surfaces D and E is to a major extent dependent upon how strongly the tightening screws in holes 25a, 25b and 25c are tightened. Preferably, these screws are placed with a certain offset with the aim of bringing about a certain fore-strain in radial direction, against surface C.

Surface A sustains the tangential forces and the moment that results in accordance with the force and equilibrium equations.

At normal parting operations, as a good approximation one can say that the difference between the forces exerting upon surfaces A and B is the tangential contribution of transversal forces according to $$F_A = F_T + F_B$$

where $F_A$ is the force on surface A, $F_B$ is the force on surface B and $F_T$ is the tangential cutting force.

Surface C sustains primarily the radial forces. Besides this, radial stop surface C reduces the forces on surfaces A and B by its low placement and thereby long lever arm, from cutting edge height to surface C.

The size relations between surfaces A, B and C, or their widths a, b and c, are substantially proportional to the loads exerted upon them, which in round numbers are 6:3:1. However, in practice the surfaces are formed with a relation of the areas of A:B:C, or the widths a:b:c, of 6:3:2, in order to cover against tool breakdown. This optimization of the individual area sizes contributes to a short and strong joint and diminishes the risk of deformations, in particular of edge and corner parts of the sustaining surfaces due to overloading.

At its front, the upper abutment surface A of the wedge part is terminated by a rounded nose part 26, and at its end by a rounded, upwardly extending surface 27. The radii of surface 27, the wedge front below nose part 26 and wedge recess 19 should be the same, in order to minimize the number of tools required at the manufacturing of the joint surface structures. Further, the round shape of nose part 26 entails the advantage that the fore part of the upper wedge surface A can support high pressure loads without any risk of deforming, which would have been the case if there had been a sharp fore edge.

In contrast to some prior constructions (see for instance the above-mentioned EP-A-300 544), the height of the joint portion of the blade part is not limited by the joint portion of the tool shaft. This difference makes possible constructions with relatively broad joint portions on the blade part in comparison with the tool shaft, which in combination with the play-free contact between wedge part 18 and wedge groove 13, optionally also in combination with the optimized abutment surfaces A, B and C, permits long grooving and parting depths. Thus, these can be in the order of 2× the length of the joint portion of the tool shaft in most working materials, substantially vibration-free. Moreover, the cutting tool according to the invention can be used for axial grooving, and also for inner grooving, thanks to the compact joint between blade part and tool shaft.

In view of the compact configuration of the joint portion, it can also be formed on the end surface of the tool shaft, perpendicularly to the longitudinal axis of the shaft, in accordance with FIG. 5. Thereby, the same blade part that is fastened along the length axis of the tool shaft in accordance with FIG. 3, can also be fastened perpendicularly to this direction. Obviously, this offers a greater flexibility at several applications. In principle, any angle may be chosen for the joint structure surface of the tool shaft in relation to the axis of the tool shaft, such as 30°, 45°, 60° and 75°.

Although the present invention makes possible long operation depths in spite of the short joint between blade part and tool shaft, it can of course also be used for shorter cutting depths. If a short blade part and a narrow cutting insert are used, one single fastening screw is sufficient for obtaining fully satisfactory fixation of the blade part.

I claim:

1. A tool shaft for securement to a blade part to form a cutting tool, the tool shaft comprising a wedge part for interaction with a wedge groove on said blade part, the wedge part to vary a distance between opposite first and second abutment surfaces of the remainder of the wedge part and the movable wedge so that a positive connection can be obtained between the blade part and the tool shaft by contacting the abutment surfaces with the wedge groove, the wedge part and the movable wedge having respective contact surfaces which are continuously in contact with each other while the distance between opposite first and second abutment surfaces is varied.

2. Tool shaft of claim 1, wherein the contact surfaces are inclined with respect to the direction in which the height is measured.

3. Cutting tool for metal machining comprising:
a blade part with a cutting insert and a tool shaft detachably connected to the blade part, whereby the blade part and the tool shaft are each provided with a joint portion adapted to each other, the joint portion of the blade part including a wedge groove having opposed first and second groove surfaces and the joint portion of the tool shaft including a wedge part fitting into the wedge groove, the wedge part including a first contact surface, an upper abutment surface for abutting the first groove surface of the wedge groove and a movable wedge, the movable wedge having a second contact surface for contacting the first contact surface and a lower abutment surface for abutting the second groove surface of the wedge groove, wherein a distance between the upper abutment surface and the lower abutment surface can be varied in order to obtain a play-free joint with the wedge groove by moving the first and second contact surfaces in continuous contact with one another.

4. Cutting tool according to claim 3, wherein the joint portion surface of the tool shaft is either parallel or perpendicular to an axis of the tool shaft.

5. Cutting tool according to claim 3, wherein the wedge part comprises a recess for accommodating the movable wedge, which is held in recess by a double-screw.

6. Cutting tool according to claim 3, wherein the tool shaft comprises an end abutment surface below the wedge part for sustaining radial forces.

7. Cutting tool according to claim 6, wherein relative sizes of the upper, lower, and end abutment surfaces, or their relative widths are substantially proportional to respective forces exerted upon each of them.

8. Cutting tool according to claim 3, wherein an upper front corner of the wedge part is rounded.

9. Cutting tool according to claim 3, wherein when the blade part is connected to the tool shaft the movable wedge is trapped between the blade part and the wedge part and is movable therein.

10. Cutting tool according to claim 3, wherein the height of the wedge part is a distance between the upper and lower abutment surfaces.

11. A cutting tool comprising:

a blade part including a cutting insert and a joint portion;

a tool shaft including a joint portion detachably connected to the joint portion of the blade part;

one of the joint portions including a wedge groove and another of the joint portions including a wedge part fitting into the wedge groove;

the wedge groove having opposed first and second groove surfaces; and the wedge part having a distance between opposed first and second abutment surfaces and including a wedge which is movable in an inclined direction with respect to a direction in which the distance is measured, wherein movement of the wedge in the inclined direction varies the distance between the opposed first and second abutment surfaces to obtain a play-free joint with the first and second groove surfaces of the wedge groove.

12. The cutting tool according to claim 11, further comprising means for attaching the wedge to the wedge part wherein the means for attaching has an axis which is inclined with respect to the direction in which the height is measured.

13. The cutting tool according to claim 11, wherein the wedge includes a contact surface which is always in contact with a surface of the wedge part as the wedge is moved.

14. The cutting tool according to claim 13, wherein the contact surface is U-shaped.

15. The cutting tool according to claim 13, wherein the contact surface is inclined and the wedge moves in a direction which is parallel to the contact surface.

16. Cutting tool according to claim 3, wherein the first and second contact surfaces are inclined with respect to a direction in which the height of the wedge part is measured.

* * * * *